Dec. 9, 1947.  F. H. GRIFFITH  2,432,475
OIL FILTER AND CONDITIONER
Filed Aug. 18, 1944

Inventor
F. H. Griffith
By Bernard F. Dawly
Attorney

Patented Dec. 9, 1947

2,432,475

UNITED STATES PATENT OFFICE 2,432,475

OIL FILTER AND CONDITIONER

Frank H. Griffith, Indiana, Pa.

Application August 18, 1944, Serial No. 550,069

1 Claim. (Cl. 210—122.5)

This invention comprises a combined oil filter and conditioner designed as an improvement over the filter of my prior Patent Number 2,337,238.

The principal object of the present invention is to provide a filter especially adapted for use on internal combustion engines of automobiles to maintain the oil relatively purified and at a temperature most conductive to effective engine operation.

Further objects of the invention are to provide a combination oil filter and oil cooler the latter being directly connected to the engine cooling system; to provide oil cooler means for contact with the oil preparatory to passage of the oil through the filtering media; and to provide a filter of improved construction which prevents blistering and rusting and insures free flow of oil through the filter at all times.

Although the filter of this invention is especially adapted for use in conjunction with the cooling system of an internal combustion engine it is also useful for the circulation of heated fluids therethrough where elevation of the oil temperature is desired.

Figure 1:
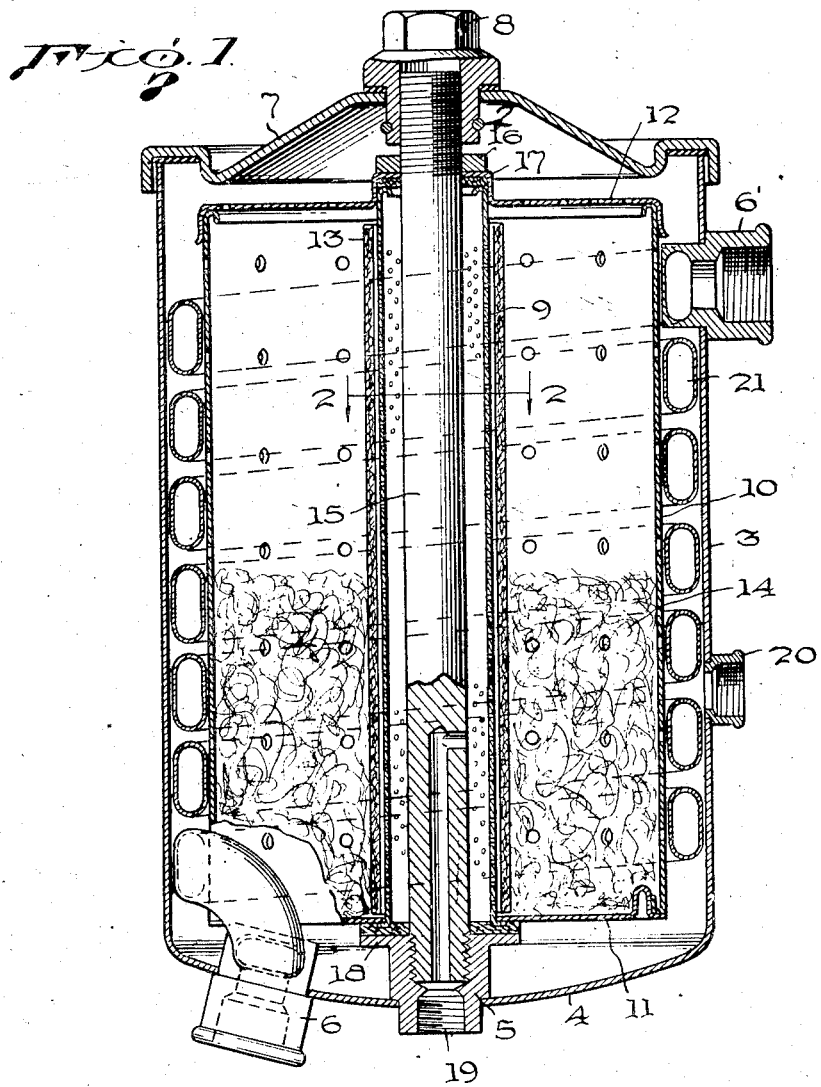
Figure 2:
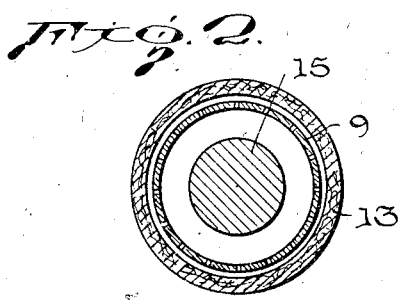

Other objects of the invention will be apparent from the following description of the present preferred form of the invention taken in connection with the accompanying drawings wherein:

Figure 1 is a longitudinal sectional view of a filter constructed in accordance with the present invention; and Figure 2 is a cross sectional view taken on the line 2—2 of Figure 1, looking in the direction of the arrows.

As in my previous patent, Number 2,337,238, the filter of this invention includes an imperforate casing 3 of cylindrical configuration with a dished base 4 provided with a central opening through which one end of an oil outlet nipple 5 extends. The base 4 is also provided with an eccentric opening in which a nipple 6 is mounted. A cover 7 is detachably mounted on the upper open end of the casing 3 and is provided with a central opening through which a nut 8 extends for a purpose more fully hereinafter set forth. The nut 8 is provided on its periphery with a groove in which is seated a retaining ring 2 to prevent casual withdrawal of the nut through the mentioned opening in cover 7.

Inner and outer perforate shells 9 and 10 respectively are concentrically mounted within the casing 3. The outer shell is provided with a closed bottom 11 and a detachable perforate top 12. A dense filtering sheet material 13 is wrapped around the inner shell 9. Mounted in the shell 10 between the inner periphery of the latter and the filtering sheet 13, is mass filtering material 14. This material fills the shell 10 from its base to its perforate top 12.

The casing 3 and shells 9 and 10 are adapted to be held in a predetermined position. The means employed for this purpose includes a solid rod 15, the upper end of which is screw-threaded and engaged with complemental threads formed in the bore of the nut 8. The threads are also adapted to be engaged by a jam nut 16 which, when in engagement, impinges a crown 17 formed centrally on the perforate top 12. This crown is adapted for the reception of the upper terminal of the shell 9, the latter being spaced from the crown by a washer or other suitable means, as shown in Figure 1. The lower end of the rod 15 is likewise screw threaded and engages complemental threads in the nipple 5. Preferably the lower end of the shell 9 is bent outwardly and engages the lower face of the bottom 11, being interposed therebetween, and a washer 18. The lower end of the rod 15 is provided with an axial oil opening 19, the lower end of which communicates with the bore of the nipple 5. The upper end of the opening extends at right angles through the wall of the rod and into communication with the interior of the shell 9.

An oil coupling 20 is mounted in the wall of the casing 3, preferably adjacent the lower end of the latter. Oil entering through said coupling is permitted to pass through the perforations in the shell 10, the mass filtering material 14, sheet filtering material 13, shell 9, for ultimate passage through the opening 19 and nipple 5.

For the purpose of cooling the oil in its flow from the filter inlet 20 to the filter outlet, I employ a coil 21 which is convoluted around the shell 10 and interposed between the latter and the inner periphery of the casing 3. One end of the coil is engaged with the nipple 6 while the opposite end is in communication with a nipple 6', the latter extending through the casing 3 adjacent the top of the latter. The nipples 6 and 6' are adapted for engagement to the cooling system of an internal combustion engine, to permit circulation of the cooling fluid through the coil 21. In this way the oil contacts the coil 21 preparatory to passage of the oil through the filtering media. Correspondingly the coils keep the interior of the filter cool, for an obvious purpose.

Although the device of the present invention is especially adapted for use with the cooling system of automobiles, it is to be understood that it is equally applicable for use with the circulation of a heating medium, where it is desired to heat the oil during its passage through the filter.

Various changes may be made in this invention within the scope of the claim hereto appended.

What I claim is:

An oil filter and conditioner comprising a casing having an oil inlet on the peripheral wall thereof and an oil outlet on the bottom wall thereof, perforate inner and outer shells concentrically mounted in the casing, filtering material within the outer shell and surrounding the inner shell, a heat exchange coil convoluted about the outer shell between the latter and said casing in close proximity to the peripheries of said outer shell and casing, means on the peripheral and bottom walls of the casing and connected with terminals of said coil for connecting the latter with a source of supply, a removable cover for the top of the casing, said cover having a central opening therein, and means for securing the casing, casing cover, and shells assembled and for conducting oil from the interior of the filter and conditioner to the oil outlet comprising a nut located in the opening of said cover, a retaining ring for the nut peripherally engaged therewith at the inner side of the cover, a substantially solid rod extending centrally through the inner shell and having an upper end threadedly engaged with said nut and a lower end threadedly engaged with the oil outlet, said rod also having an oil outlet passage of material length opening at one end through the periphery of the rod and at an opposite end through the end of the rod engaged with the oil outlet, and a washer circumjacent the lower end of the rod and interposed between the inner end of the oil outlet and the lower end of the inner shell.

FRANK H. GRIFFITH.

REFERENCES CITED

The following references are of record in the file of this patent:

UNITED STATES PATENTS

| Number | Name | Date |
|---|---|---|
| 2,337,238 | Griffith | Dec. 21, 1943 |
| 2,294,107 | Beck | Aug. 25, 1942 |
| 1,760,340 | Blackmore | May 27, 1930 |
| 1,750,073 | Walsh | Mar. 11, 1930 |
| 1,997,746 | Riehlmann | Apr. 16, 1935 |

FOREIGN PATENTS

| Number | Country | Date |
|---|---|---|
| 2,424 | Great Britain | 1898 |